United States Patent
Pfefferseder et al.

(10) Patent No.: US 7,154,649 B2
(45) Date of Patent: Dec. 26, 2006

(54) DEVICE FOR DEFLECTING OPTICAL BEAMS

(75) Inventors: Anton Pfefferseder, Sauerlach-Arget (DE); Bernd Siber, Glonn (DE); Andreas Hensel, Egmating (DE); Frank Rottmann, Munich (DE); Ulrich Oppelt, Zorneding (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/473,500

(22) PCT Filed: Apr. 3, 2002

(86) PCT No.: PCT/DE02/01195

§ 371 (c)(1),
(2), (4) Date: Apr. 6, 2004

(87) PCT Pub. No.: WO02/082161

PCT Pub. Date: Oct. 17, 2002

(65) Prior Publication Data

US 2004/0160654 A1    Aug. 19, 2004

(30) Foreign Application Priority Data

Apr. 4, 2001   (DE) ............................. 101 16 723

(51) Int. Cl.
*G02B 26/08* (2006.01)
(52) U.S. Cl. .................................................... 359/201
(58) Field of Classification Search ........ 359/196–226, 359/230; 396/111, 351, 432; 250/334, 574
See application file for complete search history.

(56) References Cited

U.S. PATENT DOCUMENTS

| 5,451,931 | A | | 9/1995 | Müller et al. |
| 5,661,591 | A | * | 8/1997 | Lin et al. ..................... 359/290 |
| 5,917,260 | A | * | 6/1999 | Garcia et al. ................. 310/80 |
| 5,923,466 | A | * | 7/1999 | Krause et al. ............... 359/389 |
| 6,253,001 | B1 | * | 6/2001 | Hoen ........................... 385/17 |
| 6,613,041 | B1 | * | 9/2003 | Schrunder ....................... 606/5 |
| 6,723,975 | B1 | * | 4/2004 | Saccomanno ............ 250/203.6 |
| 6,839,636 | B1 | * | 1/2005 | Sunshine et al. ............. 702/22 |
| 6,864,473 | B1 | * | 3/2005 | Chretien et al. ......... 250/201.1 |
| 2004/0160654 | A1 | | 8/2004 | Pfefferseder et al. |

FOREIGN PATENT DOCUMENTS

DE    44 02 775    7/1995
DE    199 06 407    8/2000

OTHER PUBLICATIONS

Patent Abstracts of Japan, vol. 1999, no. 04, Apr. 30, 1999, JP 11 003849, Jan. 6, 1999.
Patent Abstract of Japan, vol. 1999, No. 13, Nov. 30, 1999, JP 11 231234, August 27, 1999.

* cited by examiner

*Primary Examiner*—Euncha P. Cherry
(74) *Attorney, Agent, or Firm*—Kenyon & Kenyon LLP

(57) ABSTRACT

A device for deflecting optical beams is provided, the device having an array of mirror elements, and each mirror element being pivotable at any angle independently from another mirror element. This array may be manufactured micromechanically. The pivoting of the mirror element may be executed either capacitively or thermally. The array may be situated in a camera either as a deflecting mirror or as a lens. Scanning of a space element is also possible by using the array. Applications of the device include, e.g., use in a passive infrared detector, as well as use in a scattered-light smoke detector.

10 Claims, 4 Drawing Sheets

DEVICE FOR DEFLECTING OPTICAL BEAMS

FIELD OF THE INVENTION

The present invention is directed to a device for deflecting optical beams.

BACKGROUND OF THE INVENTION

The use of micromechanical mirror arrays in which the individual mirror elements are pivotable at two different angle positions is known in the art. These mirror arrays are installed in video conferencing products (beamers) for presentation, for example.

SUMMARY OF THE INVENTION

The device according to the present invention for deflecting optical beams has the advantage over the related art in that the individual mirror elements may be pivoted into any angle independently of one another. The advantage is that different optical systems such as lenses, mirrors, and aspherical geometries, e.g., parabolic reflectors, ellipsoidal reflectors, and cylindrical lenses, may be implemented. In the case of mirrors, it is possible to implement concave mirrors having different focal distances and different optical axes by controlling the individual mirror elements. The high resolution of the array and the small mass of mirror elements make it possible to modify these optical systems over time in a smooth or abrupt manner, as desired. The switching time of the individual mirror elements is very short, in the range of milliseconds or shorter, so that different optical systems are available to the optical sensor or to the image recorder in a time multiplex.

It is advantageous that the array is manufactured micromechanically. This makes it easily possible to mass-produce high-quality arrays having a plurality of mirror elements. It is a further advantage that the mirrors are pivotable either by a capacitive or thermal actuator system. The capacitive actuator system uses electric fields, while the thermal actuator system achieves pivoting of the mirror elements by using currents of different intensities resulting in differentiated heating of a micromechanical structure.

It is an additional advantage that the array according to the present invention may be inserted into the optical path of the optical system of a camera, and all mirror elements may be pivoted to the same angle. The array acts as a plane mirror and, following simple optical laws, the lens coverage of the camera is adjusted at the plane mirror using the angle of incidence and angle of deflection. Due to the simultaneous adjustment of all angles of all mirror elements, the array behaves exactly as if a plane mirror was rotated in its plane. Since all mirror elements are situated in the same plane, the optical path is partially shaded at large pivoting angles. At a 45 degree pivoting angle, a perpendicular incident beam is deflected by 90 degrees hitting the backside of the adjoining mirror element if this is deflected in the same direction. This shading is angle-dependent and amounts to approximately 50% when a beam is deflected by 60 degrees. Such a mirror array thus makes a variable adjustment of the lens coverage of the camera by 60 degrees from the beam plane into any direction possible, which is sufficient in practical applications.

It is a further advantage that the array according to the present invention may be designed as an optical imaging system (concave mirror), replacing the heavy and large lens which is normally used as an optical device in cameras. Due to the variability of the array according to the present invention, mirror lenses of different focal distances may be provided, so that the array may be used as a camera zoom system. A variable distance between the mirror and the image recorder must be provided in the case of zoom. Since mirrors do not cause refraction, no color corruption, which would be expensive to correct, takes place in mirror lenses. Additionally, the array is able to implement any optical corrections. By adapting the pivoting angles of the mirror array, the panning/tilting function is simultaneously implemented in addition to the lens. For surveillance tasks using video cameras, cameras may be mounted on powered shafts, and the viewing direction may be changed by remote control. This device is known as panning-tilting-head. If the lens in an imaging system is replaced by an array according to the present invention as a mirror and the camera is situated in the focal point of the mirror, then a panning/tilting function may be implemented via a differentiated angle alignment of the mirror elements.

It is a further advantage that a camera without an image recorder may also be implemented by using the array according to the present invention. This is achieved by scanning a space element, the scanning being focused on an optoreceiver. The array thus acts as a concave mirror. A point from the space element may be focused on the receiver by continuous or stepwise pivoting of the mirror elements. If scanning of the space by lines, similar to the function of a television tube, is selected as the scanning path, a signal is obtained at the output of the optoreceiver which is equivalent to the signal of an image recorder. In this case, the mirror array assumes the function of the lens having a variable focal distance, the panning/tilting function, and the scanning function of the image recorder. The substantial costs of the image recorders are saved, and one can utilize the high dynamics of photoreceivers used as optoreceivers, resulting in an improved brightness resolution.

In addition, the image resolution is determined by the focusing and the geometric scanning distance, so that one is no longer limited to the pixel limitation of discrete semiconductors. A CCD (charge coupled device) camera chip is an array of many photosensitive cells. These amount to approximately 780×560≈440,000 cells in conventional cameras. From the viewing field (space), a location point from the space is mapped on each pixel of the array via the lens. Assuming a wall having a width of 10 m which is mapped via the lens on the width of the CCD chip, then a wall element having a width of 10 m/780≅13 mm is mapped on a CCD element. Wall structures having a width of less than 13 mm blur and may no longer be resolved. This limit is known as resolution.

If a point from the space is mapped via a concave mirror formed by the array according to the present invention onto a photo diode having a negligible extension, and if 1/100 mm is specified for an edge length of a mirror element from the mirror array, and if a distance of 10 cm is given and focused on a wall, this results in an estimated resolution of approximately 1 mm at a distance of 10 m. If the optical axis of the mirror is subsequently slowly changed, it is possible to scan the wall over a width of 10 m using this resolution. Depending on the mirror element size, the focal distance, and the size of the photo receiver, one is able to influence the resolution without being subjected to the limitation of the pixel number of CCDs. Such a camera may be made color-capable by using three photo receivers having optical color filters.

It also an advantage that the array replaces the complicated lens system of a passive infrared detector. Lens systems for passive infrared detectors are available in different designs for different applications, e.g., for monitoring long halls or compact spaces, or for mounting on ceilings. This results in great diversity of devices, including the associated costs for development and logistics. Due to the variability of the mirror array according to the present invention, different optical geometries may be implemented, thus making the use of the mirror array in different application areas possible. For example, the mirror geometry may be designed directly on site according to the circumstances encountered there, which results in a reduction in the diversity of required devices and also allows on-site modification of the monitoring properties of the device without requiring replacement of equipment.

Furthermore, similar to the camera, the mirror array may scan the space by continuous panning. A resolved temperature profile of the space may be obtained that way, and the position and the path of moving persons may be estimated. The mirror array may be implemented using a sensor array composed of pyroelectric elements or thermopile elements. Such a sensor array could be composed of 2×2 elements or have a different size. For example, there are commercially available sector arrays having 4×8 elements. A moving person is mapped on several elements of the sensor array on the basis of the person's size. The mirror array may be controlled in a simple manner via positioning by the sensor array, so that the moving person is optically followed. If an element having a small heat capacity and a correspondingly high measuring frequency is used as a thermal image recorder, a cost-effective thermal imaging camera may be constructed using a similarly designed system.

It is a further advantage that the array according to the present invention is used in a scattered-light smoke detector which either has a maze-like measuring chamber or is an outdoor scattered-light smoke detector. The volume of the measuring chamber or the measuring volume may be scanned in space and over time by using the array. Moreover, the walls of the measuring chamber may be scanned and information about the contamination of the chamber and the availability of the system may be determined via the signal received. The signals from the different scattering areas give information about the homogeneity of the space, and conclusions may be drawn about the presence of insects and dust particles, for example. The same information is valid for scattered-light smoke detectors without a measuring chamber, which measure the smoke directly outdoors. A distinction may be made between interference and an actual smoke signal by comparing the signals from different areas.

It is a further advantage that an array according to the present invention may be used, for example, in a passive infrared sensor, as well as in a smoke detector. Thus, very compact multifunctional sensors may be implemented. Incidentally, it is also an advantage that, instead of only one array several arrays, according to the present invention may be combined in order to implement even more complex lens systems.

DETAILED DESCRIPTION

In security technology, many detection principles are based on special lens systems. Passive infrared detectors operate with segmented lenses in order to direct thermal radiation from different areas to a thermal radiation sensor. These lens systems contain mirrors and Fresnel lenses which are individually designed for the characteristics of such detectors, and these lens systems involve high development costs. According to the present invention, an array of mirror elements is used, with the individual mirror elements being pivotable at any angle independently from one another. This makes it possible to implement many different lens systems using a single array according to the present invention, which has not been possible in the past. High flexibility is thus achieved. The array according to the present invention is also referred to as a mirror array.

Figure 1:
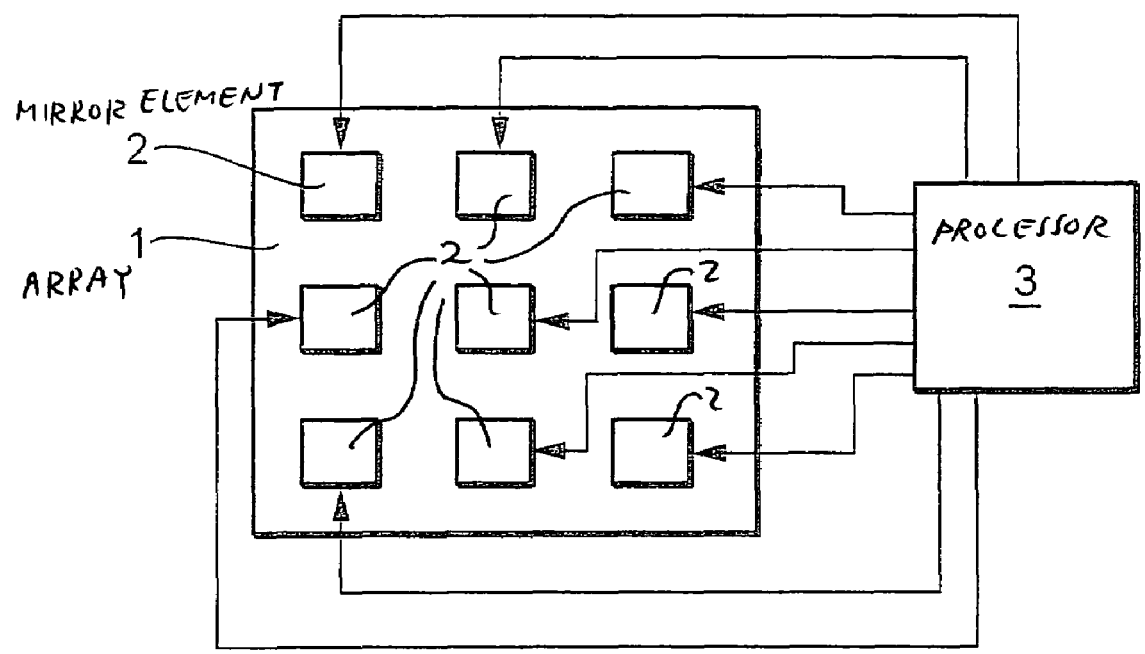
FIG. 1 shows a schematic diagram of a device according to the present invention.

FIG. 1 shows a schematic diagram of the device according to the present invention. Array 1 formed of mirror elements 2 (in this case there are nine) is controlled by a processor 3. Processor 3 is connected to each mirror element 2 via a separate line in order to pivot mirror element 2 via the actuator assigned to mirror element 2 according to the signals received by processor 3. The actuator is situated on the particular mirror element. In order to implement the control commands of processor 3, the particular actuator has additional control electronics. As an alternative, the control electronics may be centrally located to supply all actuators.

Processor 3 is connected to an input device, for example, in order to pivot mirror elements 2. In a camera, for example, the zoom is reset by the user actuating the input devices, and processor 3 realigns mirror elements 2 so that this new zoom is set. Processor 3 simultaneously controls the accurate distance between the mirror and the image recorder.

Since array 1 is micromechanically manufacturable using silicon, large-scale production and the manufacture of arrays having a large number of mirror elements are possible. Capacitive or thermal actuator systems may be used as actuator means, for example. An address electrode is used in a capacitive control of the mirror elements, the voltage between the address electrode and the mirror element determining the deflection of the mirror. Any angle of the mirror elements with respect to the surface is thus settable. The control may be performed by pulse width modulation. Mirror elements 2 may be made highly reflective via a surface treatment, for example, metalization or precipitation with a metal. In particular, wave length ranges of interest may be taken into consideration in that a coating which deflects infrared light having a high degree of efficiency may be selected for an infrared application, for example.

Figure 2:
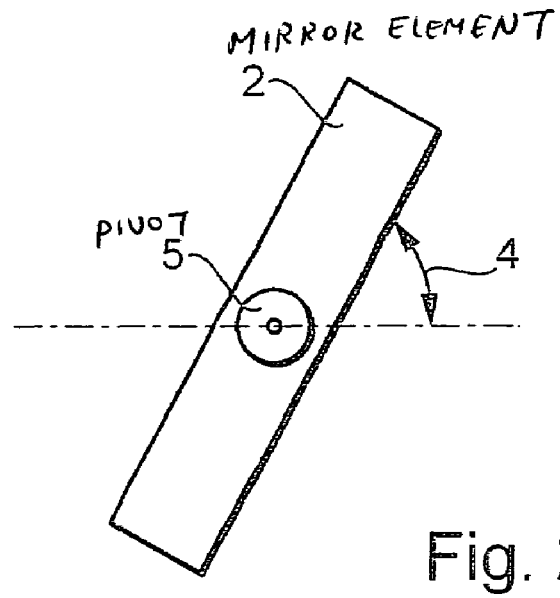
FIG. 2 shows a pivotable mirror element.

FIG. 2 shows a mirror element 2 which is pivotable about its axis, indicated by the dashed line, around a pivot 5 by an arbitrary angle 4. This is achieved via the respective actuator. Thus, the combination of the mirror elements into array 1 makes different lens systems possible.

Figure 3:
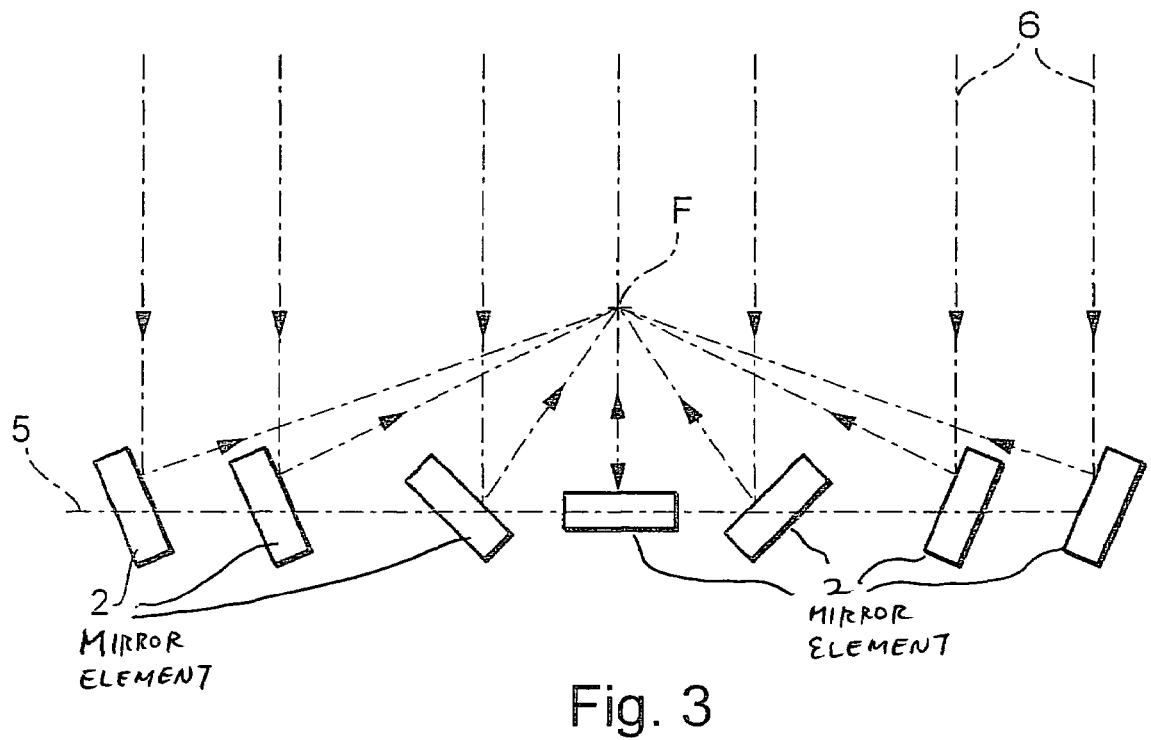
FIG. 3 shows a concave mirror formed by the array of mirror elements.

FIG. 3 shows as an example how a concave mirror may be reproduced by using array 1 and pivoting mirror elements 2. A row of seven mirror elements 2 is depicted here which are situated on axis 5. As illustrated in FIG. 1, a matrix of mirror elements 2 is also possible. By using the array according to the present invention, this allows a more complex lens system to be emulated.

Mirror elements 2 are controlled by processor 3 here so that they all point to one focal point F. Parallel incident light 6 is hereby focused on point F by mirror elements 2 implementing a concave mirror. By pivoting mirror elements 2, almost any focal point F is implementable. Other mirrors are possible by controlling the mirror elements in an appropriate manner.

Figure 4:
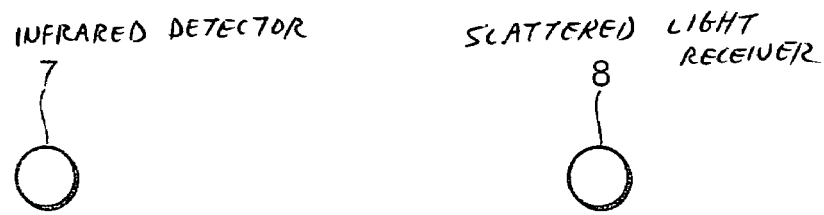
FIG. 4 shows an infrared detector in combination with a scattered-light smoke detector.
Figure 4:
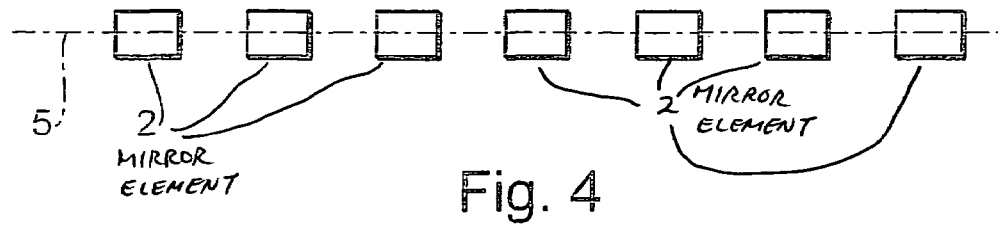

FIG. 4 shows how a combined passive infrared detector and scattered-light smoke detector is implemented using array 1 and mirror elements 2. An infrared detector 7, in this case a pyroelectric or thermopile sensor, and scattered light receiver 8 are situated in such a way that array 1 having mirror elements 2, situated on axis 5, alternately focuses the light received on both the array and the mirror elements. Thus, processor 3 controls mirror elements 2 in such a way that infrared detector 7 and scattered light receiver 8 lie in the focal point. For the sake of simplicity, the particular analyzing circuit for the signals of infrared detector 7 and scattered-light receiver 8 is not illustrated.

It is possible that a space volume is scanned using mirror elements 2. Depending on the application, the light is focused for a certain amount of time or alternatingly either onto infrared detector 7 or scattered light receiver 8.

Figure 5:
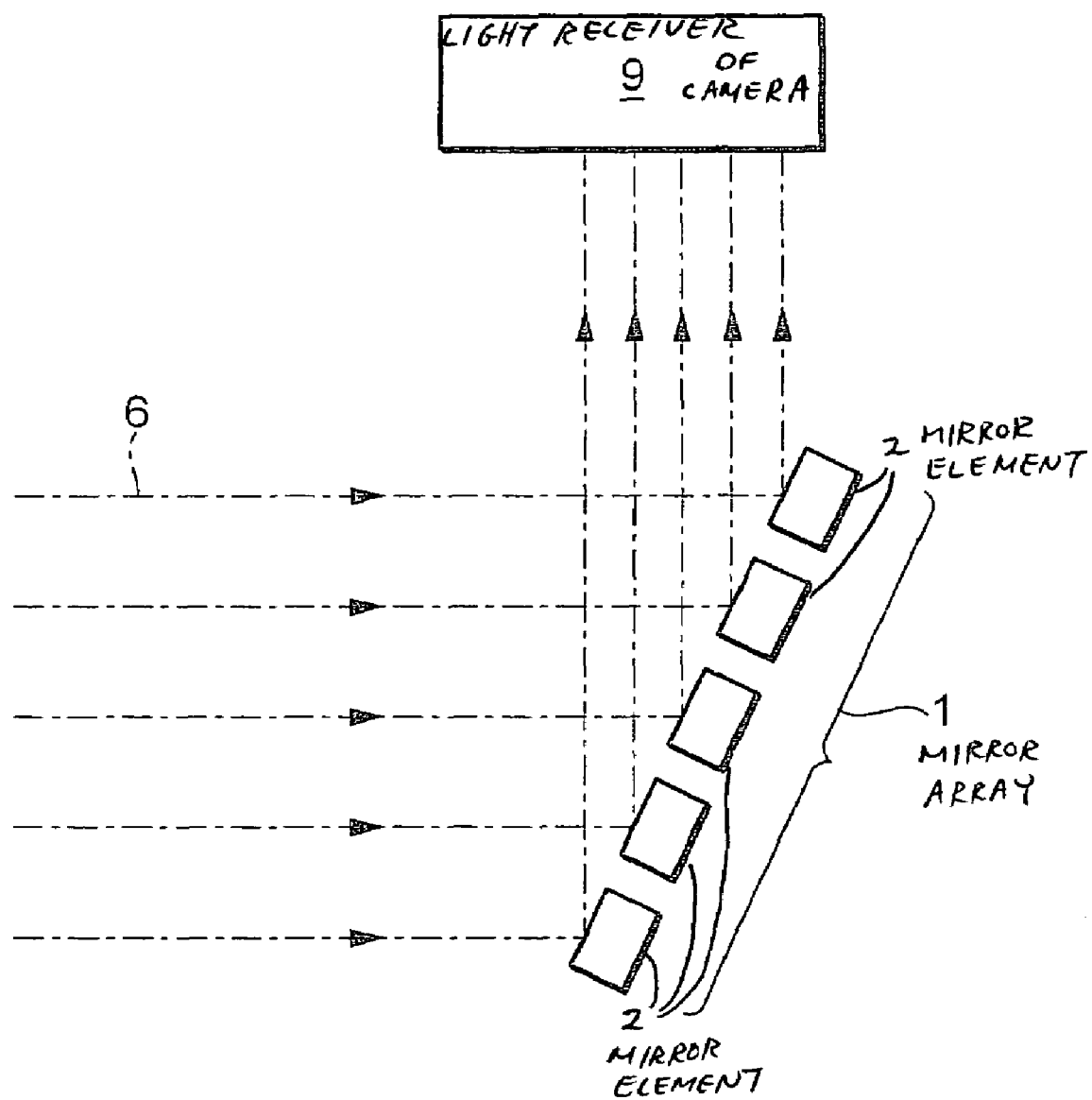
FIG. 5 shows the mirror array used in a camera as a plane mirror.

FIG. 5 shows mirror array 1 used in a camera as a plane mirror. Here again for the sake of simplicity, only one row of mirror elements 2 is illustrated, without processor 3. Mirror array 1 is characterized here in that all mirror elements 2 are synchronously pivoted to the same angle. This makes it possible to pivot the camera viewing field. Light beams 6 are deflected by mirror array 1 into a light receiver 9 of the camera.

Figure 6A:
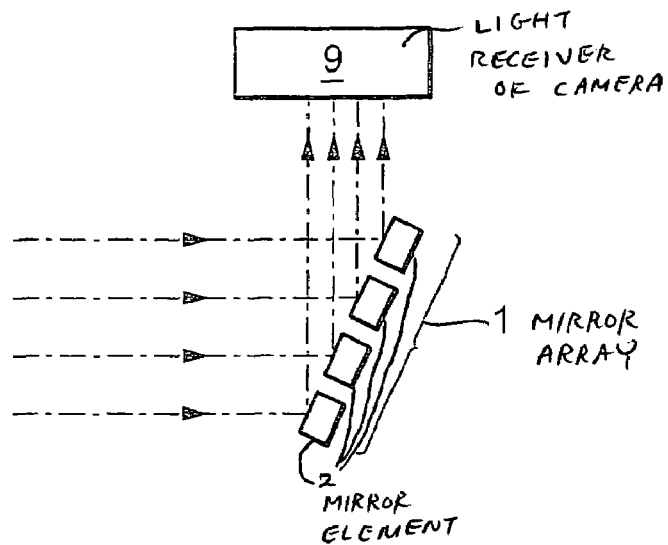
FIGS. 6a–6c show the mirror array used in a camera for spatial scanning.
Figure 6B:
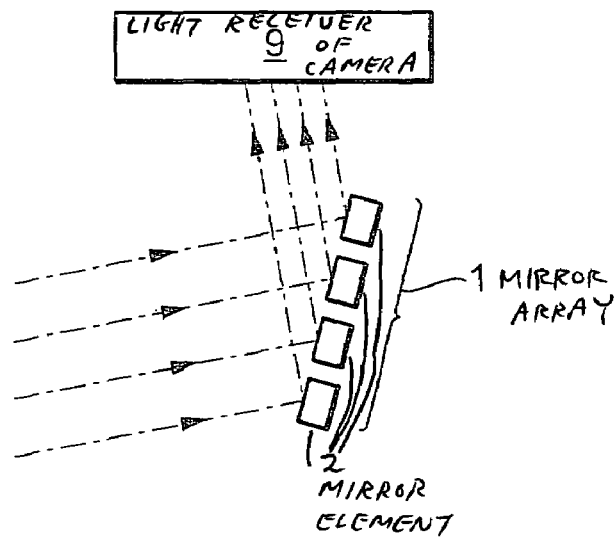
Figure 6C:
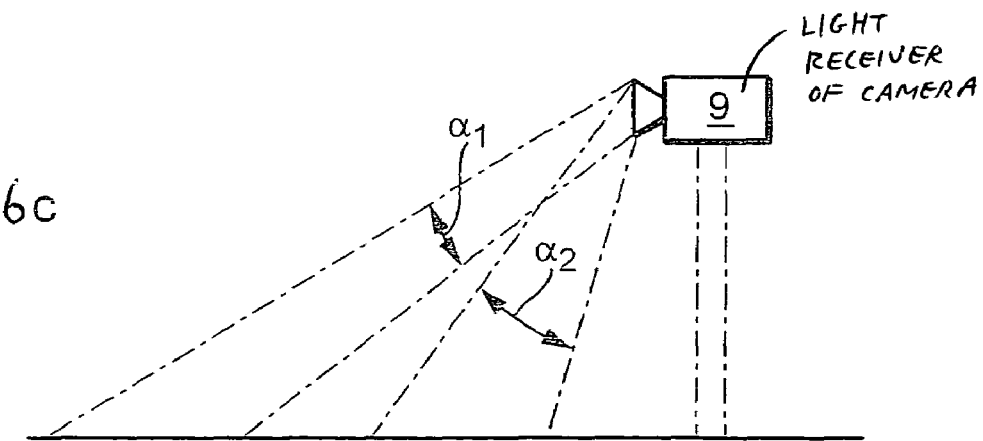

FIGS. 6*a*–6*c* show mirror array 1 used in conjunction with a camera light receiver 9 for spatial scanning. FIG. 6*a* shows all mirror elements of mirror array 1 in a first angle position, while FIG. 6*b* shows the same in a second angle position. The light, coming from the space at different angles, is deflected into camera light receiver 9. FIG. 6*c* shows both space elements which correspond to the different angles of the mirror elements in FIGS. 6*a* and 6*b*. Angle α1 corresponds to the angle of the mirror elements shown in FIG. 6*a*, and angle α2 corresponds to the angle of the mirror elements shown in FIG. 6*b*. This makes quick scanning of a space possible, since, as explained above, the individual mirror elements may be switched rapidly.

What is claimed is:

1. A device for deflecting optical beams, comprising:
   at least one array of pivotable mirror elements;
   a processor for controlling the array of pivotable mirror elements, wherein each mirror element of the array is pivotable at a selected angle independent of other mirror elements;
   wherein the at least one array is situated in a scattered-light smoke detector for scanning a scattering volume and a measured environment.

2. The device as recited in claim 1, wherein the at least one array of pivotable mirror elements is micromechanically manufactured.

3. The device as recited in claim 1, further comprising one of a capacitive actuator system and a thermal actuator system for pivoting the mirror elements.

4. The device as recited in claim 3, further comprising:
   at least one light receiver;
   wherein, for scanning a space element, the at least one array is controlled by the processor to map a light coming from the space element onto the light receiver.

5. The device as recited in claim 4, wherein the at least one light receiver is an infrared detector.

6. The device as recited in claim 5, wherein the infrared detector is a component of the scattered-light smoke detector, the scattered-light smoke detector further including a scattered-light receiver, and wherein the at least one array focuses received light onto the infrared detector and the scattered-light receiver.

7. A device for deflecting optical beams, comprising:
   at least one array of pivotable mirror elements;
   a processor for controlling the array of pivotable mirror elements, wherein each mirror element of the array is pivotable at a selected angle independent of other mirror elements;
   at least one light receiver;
   wherein, for scanning a space element, the at least one array is controlled by the processor to map a light coming from the space element onto the light receiver, and
   wherein the at least one array is situated in a scattered-light smoke detector for scanning a scattering volume and a measured environment.

8. The device as recited in claim 7, wherein the at least one light receiver is an infrared detector.

9. The device as recited in claim 8, wherein the infrared detector is a component of the scattered-light smoke detector, the scattered-light smoke detector further including a scattered-light receiver, and wherein the at least one array focuses received light onto the infrared detector and the scattered-light receiver.

10. A device for deflecting optical beams, comprising:
    at least one array of pivotable mirror elements;
    a processor for controlling the array of pivotable mirror elements, wherein each mirror element of the array is pivotable at a selected angle independent of other mirror elements;
    wherein the at least one array is situated in a scattered-light smoke detector for scanning a scattering volume and a measured environment, and
    wherein the scattered-light smoke detector includes a passive infrared sensor and a scattered-light receiver, and wherein the at least one array focuses received light onto the passive infrared sensor and the scattered-light receiver.

* * * * *